United States Patent [19]
Cox et al.

[11] 3,928,608
[45] Dec. 23, 1975

[54] CERTAIN QUINOXALINE N-OXIDES USED TO COMBAT FUNGI

[75] Inventors: John Michael Cox, Wokingham; Raymond Alexander Burrell, Yateley, both of England

[73] Assignee: Imperial Chemical Industries Limited, London, England

[22] Filed: Feb. 26, 1973

[21] Appl. No.: 336,045

[30] Foreign Application Priority Data
Mar. 14, 1972 United Kingdom............... 11766/72
Oct. 23, 1972 United Kingdom............... 48631/72

[52] U.S. Cl......... 424/250; 260/250 Q; 260/250 QN
[51] Int. Cl.²............................................ A01N 9/22
[58] Field of Search.............. 260/250 Q, 250 QN; 424/250

[56] References Cited
UNITED STATES PATENTS

| | | | |
|---|---|---|---|
| 2,644,000 | 6/1953 | Landquist | 260/250 QN |
| 3,344,022 | 9/1967 | Johnston | 260/250 QN |
| 3,720,673 | 3/1973 | Bowie | 260/250 QN |
| 3,803,145 | 4/1974 | Abushanab | 260/250 QN |

OTHER PUBLICATIONS
J. Chem. Soc. (1957), 3236–3239.

Primary Examiner—Leonard Schenkman
Attorney, Agent, or Firm—Cushman, Darby & Cushman

[57] ABSTRACT

A method of combating fungi which comprises contacting the fungi or loci thereof with a fungicidally effective amount of a quinoxaline derivative of the formula:

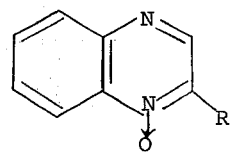

or a salt thereof wherein R is selected from the group consisting of SO₂X, SOX and SX where X contains from 1 to 7 carbon atoms and is selected from the group consisting of unsubstituted alkyl, alkenyl, alkynyl, aryl, alkaryl and aralkyl; or alkyl containing 1–7 carbon atoms substituted with halogen, carboxy, ethoxy carbonyl or thiocyano.

2 Claims, No Drawings

CERTAIN QUINOXALINE N-OXIDES USED TO COMBAT FUNGI

This invention relates to novel quinoxaline derivatives, to pesticidal, especially fungicidal and bactericidal, compositions containing them and to processes for combating pests, especially fungi and bacteria, using them.

Accordingly this invention provides quinoxaline derivatives having the formula:

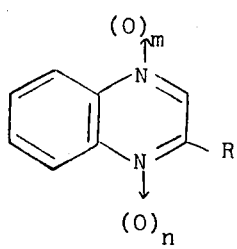

and salts thereof, wherein R is a group $SO_2X$, SOX or SX where X is an optionally substituted hydrocarbyl group; and $m$ and $n$ are zero or 1, but are not both zero when X is alkyl containing from 1 to 6 carbon atoms, nitrophenyl, allyl, or benzyl and provided that $m$ is not 1 when R and $n$ have the values $-SO_2-CH_3$ and zero, respectively.

In a further aspect the invention provides quinoxaline derivatives as defined above but which are mono-N-oxides and wherein, additionally, any of the 3-, 5-, 6-, 7- and 8-positions of the quinoxaline ring bears a substituent group. Thus the 3-position may carry, for example, a substituent halogen atom or hydrocarbyl, hydrocarbyl-oxy, -thio, -sulphonyl, or -sulphinyl group or an amino, hydroxy, cyano, carboxy or acyl group. Any of the 5-, 6-, 7- and 8- positions may carry, for example, a substituent halogen atom or hydrocarbyl, hydrocarbyl-oxy or -thio, carboxy, carboxamido, sulphonamido, nitro or perhalohydrocarbyl group.

By the term "hydrocarbyl group" is intended, in particular with reference to the substituent X, a monovalent organic radical composed of hydrogen and carbon. Such hydrocarbyl groups may be saturated or unsaturated, straight or branched chain, single ring or multi-ring; they may be, for example, akyl, alkenyl, alkynyl, cycloalkyl, aryl, aralkyl, or alkaryl groups.

The term "hydrocarbyl group" is also intended to include substituted hydrocarbyl groups as well as unsubstituted hydrocarbyl groups and by such a substituted hydrocarbyl group is intended any hydrocarbyl group as defined above wherein one or more of the hydrogen atoms present are replaced by a substituent group; such substituent groups may vary but are intended to include, for example: halogen atoms such as chlorine, bromine, fluorine and iodine; pseudo-halogen groups such as, for example, cyano, isocyano, cyanato, thiocyanato, isothiocyanato, azido and the like; amino, hydroxy, mercapto, hydrocarbyl-thio, -sulphinyl or -sulphonyl groups, which may themselves bear a substituent group; carboxylic, or sulphur-containing, acid groups and esters and amides thereof; simple heterocyclic groups; nitro groups, carboxylic acyl agroups; and groups containing aldehyde and/or ketonic functions.

Preferred substituents for X are, however, hydrocarbyl groups containing from 1 to 7 carbon atoms, such as, for example, methyl, ethyl, propyl, butyl, amyl, hexyl, heptyl, allyl, propynyl, phenyl, methylphenyl, and benzyl radicals. These radicals may have any, or all, of their hydrogen atoms substituted by one or more halogen atoms, such as, for example, chlorine, bromine, fluorine or iodine, or one or more alkoxy, carboxy, alkoxycarbonyl, perhalohydrocarbyl or thiocyanato groups.

Preferred compounds are mono-N-oxides, in particular 1-N-oxides.

A preferred substituent for R, particularly when m is zero and n is 1, is $-SO_2X$, especially when X is a methyl group, that is R represents an $-SO_2CH_3$ group.

The invention includes the novel specific quinoxaline derivatives set out in Table I below, (known compounds are marked with an asterisk) and pesticidal compositions containing, as an active ingredient, a compound listed in the Table.

These compounds correspond to the formula:

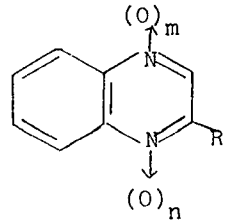

TABLE I

| Compound No. | R | n | m |
|---|---|---|---|
| 1 | $SO_2CH_3$ | 1 | 0 |
| 2 | $SO_2C_2H_5$ | 1 | 0 |
| 3 | $SO_2C_3H_7$ | 1 | 0 |
| 4 | $SO_2C_6H_4p.CH_3$ | 1 | 0 |
| *5 | $SO_2CH_3$ | 0 | 1 |
| 6 | $SOCH_3$ | 1 | 0 |
| 7 | $SCH_3$ | 1 | 0 |
| *8 | $SO_2CH_3$ | 0 | 0 |
| 9 | $SO_2CH_2COOH$ | 1 | 0 |
| 10 | $SO_2CH_2COONa$ | 1 | 0 |
| 11 | $SO_2CH_2COOC_2H_5$ | 1 | 0 |
| 12 | $SO_2CHBr_2$ | 1 | 0 |
| 13 | $SCF_3$ | 1 | 0 |
| 14 | $SO_2CH_3$ | 1 | 1 |
| 15 | $SOCH_2COOC_2H_5$ | 1 | 0 |
| 16 | $SO_2CH_2Br$ | 1 | 0 |
| 17 | $SCH_2SCN$ | 1 | 0 |
| 18 | $SO_2CH_2SCN$ | 1 | 0 |
| 19 | $SOCH_2SCN$ | 1 | 0 |
| 20 | $SO_2CH_2I$ | 1 | 0 |
| 21 | $SO_2CH_2.C_6H_5$ | 1 | 0 |
| **22 | $SO_2CHCl_2$ | 1 | 0 |
| ***23 | $SO_2CH_2Cl$ | 1 | 0 |

*Compounds Nos. 5 and 8 are known compounds. (G W H Cheeseman, J.Chem.-Soc (1957) 3236-9).
**Compound No.22 has an M.p. of 166°C
***Compound No.23 has an M.p. of 196°C All the specific compounds set out in Table I, except the compounds numbered 5 and 8, are new and this invention includes these new compounds per se.

In general the compounds of this invention can be prepared by treating 2- or 3- substituted quinoxalines (or mono- or di-oxides), with nucleophilic reagents. Furthermore, such products may be oxidized (e.g. with permaleic, m-chloro-perbenzoic, pertrifluoroacetic or peroxymonosulphuric acid or a permanganate) and thereafter may be optionally halogenated. Alternatively, 2-mercapto quinoxalines, or N-oxides thereof, may be alkylated and further oxidized. The aforementioned processes form part of the present invention in so far as they relate to the preparation of new compounds.

The compounds, and compositions containing them, are variously active against the following diseases:

Seed and Soil-Borne Fungal Diseases:

| | Examples of host crop | |
| --- | --- | --- |
| Pythium ultimum | Peas | Damping off |
| Phytophthora cactorum | Soy Beans | Phytophthora Root Rot |
| Phytophthora palmivora | Cocoa | Cocoa Black Pod |
| Fusarium culmorum | Wheat | Brown Foot Rot |
| Fusarium nivale | Rye | Brown Foot Rot |
| Gibberalla zeae | Maize | Foot Rot |
| Helminthosporium sativum | Barley | Foot Rot |
| Helminthosporium victoriae | Oats | Victoria Blight |
| Septoria nodorum | Wheat | Glume Blotch |
| Ascochyta pisi | Pea | Leaf and Pod Spot |
| Rhizoctonia solani | Cotton | Sore Shin |
| Sclerotinia sclerotiorum | Soy Beans | Stem Rot |

Foliage-borne Diseases:-

| | | |
| --- | --- | --- |
| Puccinia recondita | Rust | on wheat |
| Phytophthora infestans | Late Blight | on tomatoes |
| Plasmopara viticola | downy mildew | on vines |
| Botrytis cinerea | grey mould | on tomatoes or strawberries |
| Podosphaera leucotricha | powdery mildew | on apples |

Post-Harvest Fungal Diseases.

| Fungal Disease Organism | Examples of Host Crop(s) | Name |
| --- | --- | --- |
| Botrytis tulipae | Bulbs | Fire |
| Nigrospora sphaerica | Bananas | Squirter |
| Phomopsis citri | Citrus | Stem End Rot |
| Alternaria citri | Citrus | Stem End Rot |
| Penicillium italicum | Citrus | Blue Mould |
| Penicillium digitatum | Citrus | Green Mould |
| Gloeosporium musarum | Bananas | Anthra |
| Botryodiplodia theobromae | Bananas | Blackend |
| Fusarium caeruleum | Potato | Dryrot |
| Ceratocystis paradoxa | Sugarcane, pineapple | Pineapple Disease |
| Phoma exigua | Potato | Gangrene |
| Phytophthora parasitica | Citrus | Brown Rot |
| Diplodia natalensis | Citrus | Stem End Rot |

Bacterial Diseases:

| Bacterial Disease Organism | Examples of Host Crop(s) | Name |
| --- | --- | --- |
| Agrobacterium tumefaciens | Nursery plants, vegetables | Crown Gall |
| Corynebacterium michiganense | Tomato | Canker |
| Xanthomonas malvacearum | Cotton | Blackarm |
| Xanthomonas oryzae | Rice | Blight |
| Pseudomonas syringae | Beans, Stone Fruit | Dieback |
| Pseudomonas mors-prunorum | Stone Fruit | Canker |
| Pseudomonas phaseolicola | Bean | Haloblight |
| Erwinia amylovora | Apple, Pear | Fireblight |

In a further aspect, therefore, this invention provides a process for combating pests, especially fungi and bacteria, which comprises treating the pests; or treating plants, seeds, harvested fruits or vegetables, infested with, or liable to infestation with the pests; with a quinoxaline derivative, or composition comprising such a derivative, as herein defined.

The term "seeds" is intended to include propagative plant forms generally and therefore includes, for example, cut stems, corms, tubers, rhizomes and the like.

The active compounds of this invention may be used alone to combat pests but are preferably formulated into compositions for this purpose. Preferred compositions contain, as an active ingredient, a preferred compound.

In a further aspect, therefore, the invention provides a pesticidal, especially fungicidal or bactericidal, composition comprising, as an active ingredient, a compound as defined in any of the preceding paragraphs; together with a carrier substance therefor. The carrier may be a solid or liquid diluent. In the case of a liquid diluent being used it is preferred that the composition then also contains a surface active (wetting) agent.

This invention is not, however, to be considered restricted to pesticidal compositions containing novel quinoxaline derivatives as defined herein and pesticidal compositions are within the scope of the invention which contain known quinoxaline derivatives.

In a yet further aspect, therefore, the present invention provides a composition for combating plant or soil-borne fungi and bacteria comprising, as an active ingredient, a quinoxaline derivative having the formula:

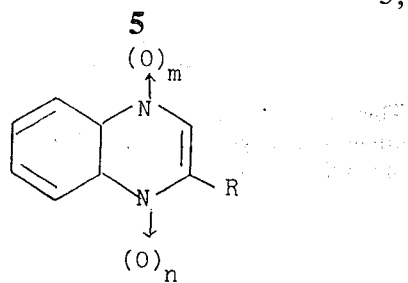

or a salt thereof, wherein R is a group $SO_2X$, SOX or SX where X is an unsubstituted or substituted hydrocarbyl group, m and n are each zero or 1; and wherein additionally any of the 3-, 5-, 6-, 7- and 8- positions of the quinoxaline ring bear substituent groups; together with a carrier substance for the active ingredient, said carrier comprising a solid diluent or a liquid diluent containing a wetting agent.

The compositions of the invention may be in the form of dusting powders or granules wherein the active ingredient is mixed with a solid diluent or carrier. Suitable diluents or carriers may be, for example kaolin, bentonite, kieselguhr, dolomite, calcium carbonate, talc, powdered magnesia, Fuller's earth, gypsum, Hewitt's earth, diatomaceous earth and China clay. Compositions for dressing seed, for example, may comprise an agent assisting the adhesion of the composition to the seed, for example a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally solutions, aqueous dispersions or emulsions containing the active ingredient in the presence of one or more wetting agents, dispersing agents, emulsifying agents or suspending agent.

Wetting agents, dispersing agents and emulsifying agents may be of the cationic, anionic, or non-ionic type. Suitable agents of the cationic type include, for example quaternary ammonium compounds, for example, cetyltrimethyl ammonium bromide. Suitable agents of the anionic type include for example, soaps, salts of aliphatic monoesters of sulphuric acid, for example soduim lauryl sulphate, salts of sulphonated aromatic compounds, for example sodium dodecylbenzenesulphonate, sodium, calcium or ammonium lignosulphonate, butyl-naphthalene sulphonate, and a mixture of the sodium salts of diisopropyl- and triisopropylnaphthalene sulphonic acids. Suitable agents of the non-ionic type include, for example, the condensation products of ethylene oxide with fatty alcohols such as oleyl alcohol or cetyl alcohol, or with alkyl phenols such as octylphenol, nonylphenol and octylcresol.

Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums for example gum acacia and gum tragacanth.

The aqueous solutions, dispersions or emulsions may be prepared by dissolving the active ingredient in water or water and an organic solvent which may contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain on treated surfaces, the different compositions can be better adapted for the various uses for which they are intended.

The compounds may also be conveniently formulated by admixing them with fertilizers. A preferred composition of this type comprises granules of fertilizer material incorporating an invention compound. The fertilizer material may, for example, comprise nitrogen, or phosphate- containing substances.

The compositions which are to be used in the form of a aqueous dispersions or emulsions are generally supplied in the form of a concentrate containing a high proportion of the active ingredient, the said concentrate to be diluted with water before use.

The concentrates are often required to withstand storage for prolonged periods and after such storage, to be capable of dilution with water in order to form aqueous preparations which remain homogeneous for a sufficient time to enable them to be applied by conventional spray equipment.

The concentrates may conveniently contain from 10–85% and generally from 25–60% by weight of the active ingredient. When diluted to form aqueous preparations, such preparations, may contain varying amounts of the active ingredient depending upon the purpose for which they are to be used, but an aqueous preparation containing between 0.01% and 10% by weight of active ingredient may be used.

It is to be understood that the fungicidal compositions of this invention may comprise, in addition to one or more compounds to the invention, one or more other compounds having biological activity.

The invention is illustrated but not limited by the following examples.

EXAMPLE 1

This example illustrates the preparation of 2-methane sulphonyl-quinoxaline-1-oxide having the structural formula:

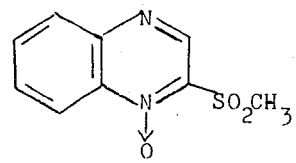

A mixture of 2-chloroquinoxaline 1-oxide (1.8 g), aqueous sodium methane sulphinate solution (5 ml, containing 0.015 moles), ethanol (10 ml) and water (5 ml) was heated at 100°C for 4 hours. It was then cooled and the precipitate filtered off and dried to give the title compound (1.6 g.) m.p. 157°C. Recrystallisation from isopropanol gave material m.p. 165°C.

EXAMPLE 2

This example illustrates the preparation of 2-ethanesulphonyl quinoxaline 1-oxide having the structural formula:

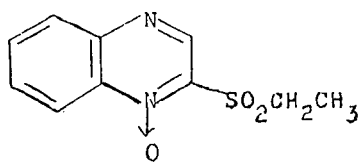

A mixture of 2-chloroquinoxaline 1-oxide (3.6 g), aqueous sodium ethanesulphinate solution (16.2 ml., containing 0.03 moles), ethanol (20 ml) and water (10 ml) was refluxed for 5 hours. It was then cooled and the precipitate filtered off and dried to give the title compound (2.92 g, m.p. 168°–170°C) Recrystallisation from ethanol gave material m.p. 174°–175°C.

EXAMPLE 3

This example illustrates the preparation of 2-n-propanesulphonylquinoxaline 1-oxide having the structural formula:

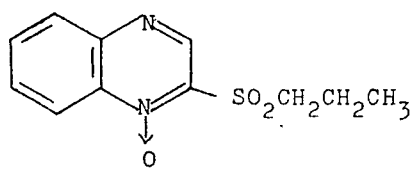

A mixture of 2-chloroquinoxaline 1-oxide (26.4 g), aqueous sodium n-propylsulphinate solution (185 ml, containing 0.225 moles), ethanol (150 ml) and water (75 ml) was refluxed for 5 hours, cooled, and extracted with dichloromethane. The extracts were dried and evaporated and the residue extracted with hot cyclohexane (6 × 250 ml). The resultant solution was evaporated to dryness, then recrystallised from isopropanol to give the title compound (10.0 g) m.p. 66°–67°. Further recrystallisation gave material m.p. 75°–76°.

EXAMPLE 4

This example illustrates the preparation of 2(p-toluenesulphonyl) quinoxaline 1-oxide having the structural formula:

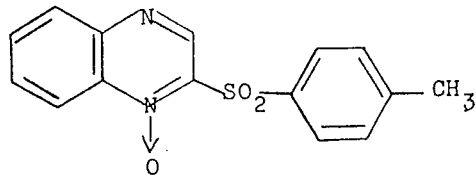

A mixture of sodium p-toluenesulphinate tetrahydrate (3.5 g), 2-chloroquinoxaline 1-oxide (2.25 g) and ethanol (75 ml) was refluxed for 5 hours. It was then filtered and the olid obtained washed with ethanol and water. Recrystallisation from acetonitrile gave the title compound (2.0 g, m.p. 242°–244°C).

EXAMPLE 5

This example illustrates the preparation of 3-methanesulphonylquinoxaline 1-oxide having the structural formula:

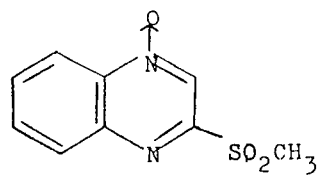

m-Chloroperbenzoic acid (3.45 g) was added slowly, with cooling, to a solution of 2-methylthioquinoxaline (1.76 g) in dichloromethane (50 ml). After 4 hours more oxidant (3.45 g) was added and the mixture stirred for 3 days at room temperature. It was then extracted with sodium bicarbonate solution and the organic layer dried and evaporated. The residue was triturated with ether then recrystallized from acetonitrile to give the title compound (1.00 g), m.p. 193°–196°.

EXAMPLE 6

This example illustrates the preparation of 2-methanesulphinylquinoxaline 1-oxide having the structural formula:

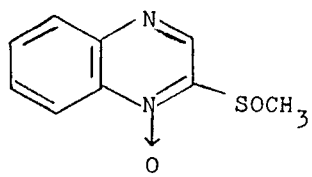

m-Chloroperbenzoic acid (3.45 g) was added slowly, with cooling, to a solution of 2-methylthioquinoxaline 1-oxide (3.84 g, prepared as described in Example 7) in dichloromethane (100 ml). After standing overnight, the mixture was washed with sodium bicarbonate solution, dried and evaporated. The residue was recrystallised from methanol to give the title compound (2.8 g), m.p. 185°–188°.

EXAMPLE 7

This example illustrates the preparation of 2-methylthioquinoxaline 1-oxide having the structural formula:

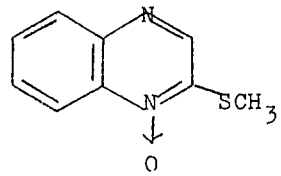

A mixture of 2-chloroquinoxaline 1-oxide (9.0 g), potassium carbonate (20 g), methyl mercaptan (4.8 g) and acetone (200 ml) was refluxed for 5 hours, filtered hot and evaporated. The residue was recrystallised from methanol to give the title compound (7.9 g), m.p. 149°–152°.

EXAMPLE 8

This example illustrates the preparation of 2-methanesulphonylquinoxaline having the structural formula:

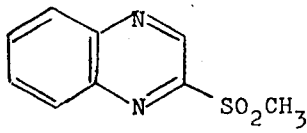

A solution of potassium permanganate (6.0 g) in water (200 ml) was added dropwise, with stirring, to a solution of 2-methylthioquinoxaline (2.96 g) in acetic acid (20 ml) The resultant mixture was decolorized with sodium meta-bisulphite and extracted with dichloromethane. The extracts were evaporated and the residue recrystallized from methanol to give the title compound (1.8 g), m.p. 120°–121°.

EXAMPLE 9

This example illustrates the preparation of (quinoxalin-2-yl-sulphonyl) acetic acid 1-oxide having the structural formula:

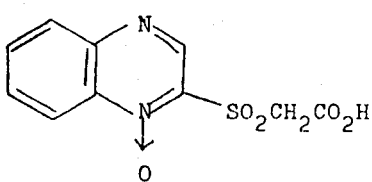

2-chloroquinoxaline 1-oxide (9.0 g) was added portionwise to a solution of thioglycollic acid (6.0 g) in saturated sodium bicarbonate solution (130 ml). Following the addition, the mixture was stirred for 30 minutes then acidified with dilute hydrochloric acid. The solid obtained was recrystallized from aqueous dimethylformamide to give (quinoxalin-2-ylthio) acetic acid 1-oxide (9.72 g), m.p. 185°–186°. Potassium permanganate (6.0 g) was added over 1 hour to a stirred and ice-cooled suspension of this intermediate (2.5 g) in 2.5 N sulphuric acid (60 ml). Further portions of oxidant were added after 3 hours and 4 hours (1.0 g and 0.45 g respectively). After a total of five hours, sodium metabisulphite (7.0 g) was added to give a white solid. This was dried and recrystallized from acetonitrile to give the title compound (1.26 g), mp. 157°–159°.

EXAMPLE 10

This example illustrates the preparation of the sodium salt of the acid described in Example 9.

To the acid (1.34 g) suspended in water was added an aqueous solution of sodium bicarbonate (0.42 g). The mixture was stirred until almost clear, filtered and evaporated to give the title compound (1.45 g) m.p. 160°–165°(decomp).

EXAMPLE 11

This example illustrates the preparation of ethyl (quinoxalin-2-ylsulphonyl)acetate 1-oxide having the structural formula:

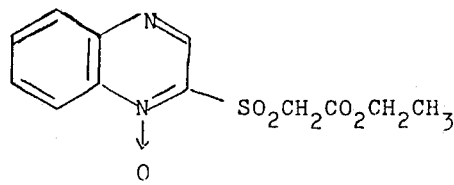

A mixture of 2-chloroquinoxaline 1-oxide (3.0 g), ethyl thioglycollate (2.2 g) potassium carbonate (6.6 g) and acetone (40 ml) was refluxed for 5 hours, cooled and filtered. The solid was stirred with water and the insoluble material dried. It was recrystallized from acetonitrile to give ethyl (quinoxalin-2-ylthio) acetate 1-oxide (2.9 g), m.p. 182°–183°. Potassium permanganate (7.5 g) was added over 20 minutes to a stirred and ice-cooled suspension of this intermediate (2.7 g) in IN sulphuric acid (200 ml). After a further one hour the mixture was decolorized with sodium metabisulphite and the solid filtered and dried. Recrystallization from methanol gave the title compound (1.78 g) m.p. 146°–7°.

EXAMPLE 12

This example illustrates the preparation of 2-dibromomethanesulphonylquinoxaline 1-oxide having the structural formula:

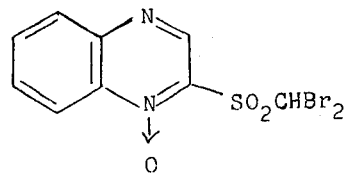

A solution of (quinoxalin-2-ylsulphonyl) acetic acid 1-oxide (1.34 g, prepared as described in Example 9) in saturated sodium bicarbonate solution (50 ml) was added slowly to a solution of bromine (1.0 ml) in saturated sodium bicarbonate solution (50 ml). The mixture was stirred for 30 minutes, then the precipitate filtered off and dried. Recrystallization from isopropanol gave the title compound (1.25 g) m.p. 163° (decomp).

EXAMPLE 13

This example illustrates the preparation of 2-trifluoromethylthioquinoxaline 1-oxide having the structural formula:

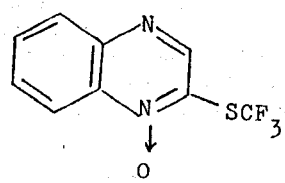

A solution of 2-chloroquinoxaline 1-oxide (3.6 g) and bis(trifluoromethylthio)mercury (4.0g) in *diglyme (20 ml) was heated at 110° for 4 hours, then evaporated in vacuo. The residue was extracted with refluxing 40/60 petroleum (2 × 60 ml). and the solution evaporated to dryness. The oily solid obtained was redissolved in ether and washed with dilute sodium hydroxide solution. The ethereal layer was washed, dried, evaporated and recrystallized from 40/60 petroleum to give the title compound (1.06 g) m.p. 64°. A second crop of 1.05g, m.p. 57°–60°, was further ob-

EXAMPLE 14

This example illustrates the preparation of 2-methanesulphonylquinoxaline 1,4-dioxide having the structural formula:

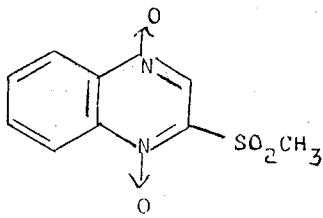

An ice-cooled solution of 2-chloroquinoxaline 1-oxide (20.0 g) in trifluoroacetic acid (200 ml) was treated with 85–90% hydrogen peroxide (20 ml). After 2 hours, the cooling bath was removed and the solution allowed to stand at room temperature overnight. Water (200 ml) was added and the solution extracted with chloroform. The extracts were washed with sodium bicarbonate solution, dried, evaporated and recrystallized from isopropanol to give 2-chloroquinoxaline 1,4-dioxide (10.6 g), m.p. 189°–191° (decomp). This material (4.0 g) was heated at 100°, for 30 minutes, with a solution of sodium methanesulphinate in dimethylformamide (0.08 moles in 40 ml). The mixture was cooled, diluted with water and the precipitate filtered. Recrystallization from ethanol gave the title compound (2.0 g), m.p. 191°–193° (decomp).

EXAMPLE 15

This example illustrates the preparation of ethyl (quinoxalin-2-ylsulphinyl) acetate 1-oxide having the structural formula:

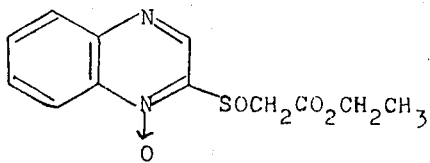

A solution of ethyl (quinoxalin-2-ylthio) acetate 1-oxide (1.85 g, prepared as described in the first part of Example 11) and m-chloroperbenzoic acid (1.33 g) in chloroform (35 ml) was allowed to stand for 1 hour then extracted with saturated sodium bicarbonate solution. The chloroform layer was washed, dried, evaporated and recrystallised from ethanol to give the title compound (1.44 g) m.p. 138°–9°.

EXAMPLE 16

This example illustrates the preparation of 2-bromomethanesulphonylquinoxaline 1-oxide having the structural formula:

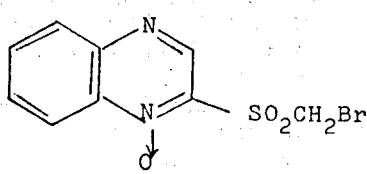

A solution of bromine (3.2 g) in dimethylsulphoxide (45 ml) was added dropwise, with stirring, to a solution of (quinoxalin-2-ylsulphonyl) acetic acid 1-oxide (5.36 g, prepared as described in Example 9) in dimethyl sulphoxide (120 ml). After standing overnight at room temperature, the solution was cooled and diluted with water. The precipitate was dissolved in dichloromethane, washed with 0.2N sodium hydroxide solution, dried and evaporated to give the title compound (1.50 g), m.p. 190°. Recrystallization from acetonitrile gave material m.p. 196° (decomp).

EXAMPLE 17

This example illustrates the preparation of 2-thiocyanatomethylthioquinoxaline 1-oxide having the structural formula:

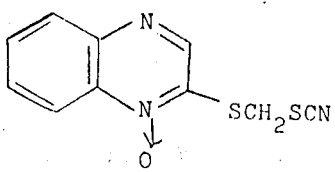

A mixture of 2-chloroquinoxaline 1-oxide (18.0 g), sodium sulphide nonahydrate (36.0 g), water (160 ml) and ethanol (250 ml) was refluxed, under nitrogen, for 1 hour. It was cooled, filtered and the filtrate acidified with dilute hydrochloric acid to give 1-hydroxyquinoxal-2-thione (14.7 g) m.p. 124°–125°.

A filtered solution of this intermediate (9.0 g) in N sodium hydroxide solution (50 ml) and methanol (100 ml) was treated with chloromethylthiocyanate (5.5 g) and the mixture refluxed for 3 hours under nitrogen. It was cooled and the solid filtered, washed with water, dried, and extracted with cold acetone (5 × 100 ml). The extracts were evaporated and the residue recrystallized from acetonitrile to give the title compound (6.2 g), m.p. 131°–134° (decomp.).

EXAMPLE 18

This example illustrates the preparation of 2-thiocyanatomethanesulphonylquinoxaline 1-oxide having the structural formula:

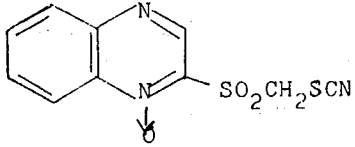

A mixture of 2-thiocyanatomethylthioquinoxaline 1-oxide (2.0 g, prepared as described in Example 17), potassium permanganate (8.0 g) and N sulphuric acid (130 ml) was stirred for 2 hours at room temperature, then cooled and decolorized with sodium metabisulphite. The solid was filtered, washed with water and dried to give the title compound (1.51 g) m.p. 176°–7° (decomp.). Recrystallization from acetonitrile gave material m.p. 178°.

EXAMPLE 19

This example illustrate the preparation of 2-thiocyanatomethanesulphinylquinoxaline 1-oxide having the structural formula:

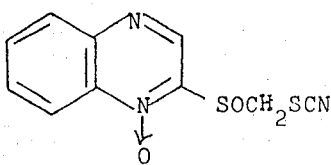

A solution of 2-thiocyanatomethylthioquinoxaline 1-oxide (1.42 g) and m-chloroperbenzoic acid (0.98 g) in chloroform (60 ml) was allowed to stand overnight at room temperature. The precipitate was filtered off, washed with acetone (2 × 5 ml) and dried to give the title compound (0.51 g) m.p. 190°. Recrystallization from acetonitrile gave material m.p. 196°.

EXAMPLE 20

This example illustrates the preparation of 2-iodomethanesulphonylquinoxaline 1-oxide having the structural formula:

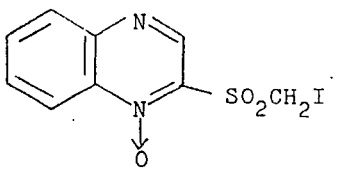

An aqueous solution of iodine (5.1 g) and potassium iodide (3.3 g) was added slowly, with stirring, to a solution of (quinoxalin-2-ylsulphonyl) acetic acid 1-oxide (5.36g) in saturated sodium bicarbonate solution (80 ml). The mixture was stirred for a further 2 hours then filtered. The solid was washed with water and dried to give the title compound (2.68 g), m.p. 185°–187°. Recrystallization from isopropanol gave material, m.p. 188°–189°.

EXAMPLE 21

This example illustrates the preparation of 2-phenylmethanesulphonylquinoxaline 1-oxide having the structural formula:

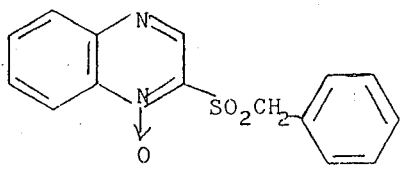

A mixture of 2-chloroquinoxaline 1-oxide (9.0 g), benzyl mercaptan (8.0 g), potassium carbonate (20.0 g) and acetone (150 ml) was refluxed for 4 hours, cooled and filtered. The solid was washed well with acetone and the combined filtrates evaporated to give 2-benzylthioquinoxaline 1-oxide (6.6 g), m.p. 145°–8°. Recrystallization from methanol gave material m.p. 147°–8°. A mixture of this material (2.0 g), potassium permanganate (11.0 g) and N sulphuric acid (150 ml) was stirred overnight at room temperature then cooled and decolorized with sodium metabisulphite. The solid was filtered off, washed with water, dried and recrystallized from methanol to give the title compound (1.39 g), m.p. 189°–190°.

EXAMPLE 22

Compositions according to the invention were made up and tested against various soil-borne fungal diseases, and the procedure used in these tests, and the results obtained in each of them, are shown hereinafter. The compound tested, and results, are listed in Table II.

Test against *Pythium ultimum*-Procedure.

Approximately one gram portions of culture of *Pythium ultimum* maintained on 2% malt agar test tube slopes at 20°C are transferred to about 400 grams of sterilized soil containing 5% maize meal in a 300 ml bottle. After 10 to 14 days the inoculated soil is mixed with sterile John Innes seed compost at a rate of 800 grams of soil culture to 32 liters of compost.

The mixture is moistened and covered and after three days is used as follows. Approximately 100 grams of the mixture is placed into a fibre pot and 10 pea seeds coated 2 days beforehand with chemical under test at the rate of 500 ppm. are sprinkled on the surface of the soil. Another 100 grams of the mixed soil is then placed on top of the seeds and the pot is kept in the greenhouse at between 16° and 22°C. A first count of emergent seedlings is made after 10 days and another week is allowed to lapse before a second visual assessment takes place by pulling the seedlings up and inspecting their roots. Six replicates are conducted and observations are made of the number of healthy seedlings and the number of unhealthy seedlings. The number of ungerminated seeds is 10 less the number of emergent seedlings. Controls wherein untreated seed is used, and also standards wherein seed treated with Thiram are used, are simultaneously carried out. Calculations are then made whereby a grading is obtained for disease control.

Test against *Fusarium culmorum* — Procedure.

In the test John Innes seedling compost is admixed with a culture of *Fusarium culmorum* grown on an admixture of soil and cornmeal and the entire mixture then wrapped in brown paper and incubated in the glasshouse for 48 hours. The incubated soil is placed in pots; then seeds (twenty per pot) treated with china clay compositions containing the invention compound in concentration of 1000 parts per million are sown in the pots. Seeds treated with "AGROSAN" (Trade Mark) mercury seed dressing are used as a standard. Counts of the seedlings emergent 10 days after sowing are taken and the results converted to a percentage of the seeds sown. Disease assessments are made 16 days after sowing.

Test against *Rhizoctonia solani* — Procedure.

In the test an inoculum of *Rhizoctonia solani* is added to a partially sterilized loam soil, to provide the latter with a 1% w/w content of the inoculum. The loam soil is then allowed to stand for 1 week so as to be completely colonised by the disease. The compound is then admixed with the loam soil at a rate of 100 parts per million parts of soil (by weight). After standing for 4 days to allow the chemical to take effect plastic pots are half-filled with untreated, partially sterilized, loam soil and cotton seeds sown on the surface thereof, whereafter the pots are topped up with the treated loam soil.

A control experiment is conducted with P C N B (pentachloronitrobenzene). The pots are then inspected and assessed 13 days later for disease.

The results of the three foregoing tests are expressed as gradings as follows:

| Grading | Significance of Grading |
|---|---|
| 0 | No activity or up to 20% of the disease control given by standard. |
| 1 | 20-75% of the disease control given by standard. |
| 2 | 75-99% of the disease contro given by standard. |
| 3 | Degree of control equal to, or better than, standard. |

TABLE II

| Compound No. | Disease | | | |
|---|---|---|---|---|
| | Pythium ultimum | Fusarium culmorum | Rhizoctonia solani | Verticillium alboatrum |
| 1 | 3 | 3 | 3 | 0 |
| 2 | 3 | 3 | 1 | 0 |
| 3 | 3 | 0 | 3 | 0 |
| 4 | 0 | 3 | 0 | 0 |
| 5 | 1 | 0 | 0 | — |
| 6 | 3 | 2 | 2 | 1 |
| 8 | 0 | 0 | 1 | — |
| 9 | 0 | 0 | 2 | 0 |
| 10 | 3 | 2 | 0 | 0 |
| 11 | 0 | 2 | 2 | 0 |
| 12 | 0 | 1 | 2 | 0 |
| 14 | 3 | 0 | 3 | 0 |
| 15 | 1 | 2 | 1 | 0 |
| 16 | 2 | 3 | 3 | 2 |
| 17 | 0 | 0 | 0 | 0 |
| 18 | 0 | 1 | 0 | — |
| 19 | 4 | 3 | 2 | 2 |
| 20 | 2 | 3 | 3 | — |
| 21 | 1 | — | — | — |
| 22 | 1 | 2 | 0 | — |
| 23 | 3 | 2 | 1 | — |

EXAMPLE 23

The activity of the compounds of the invention against a wide variety of plant bacterial diseases and fungal post-harvest saprophytic diseases was investigated by in vitro tests as follows. 5 mg. of the compound under test was dissolved or suspended in 10 cc. of 10% aqueous acetone and 2 cc. of this solution or suspension was added to 18 cc. of nutrient agar (for the bacterial diseases) of 16 cc. of 2% malt agar (for the fungal diseases) to give a final concentration of 50 parts per million of the compound under tests. 2 cc. of a streptomycin preparation containing 100 units/cc. was added to the malt agar to prevent bacterial contamination of the fungal tests.

The agar preparations were dried overnight in petri dishes and inoculated the following morning with the bacterial or fungal diseases using a multipoint inoculator. The antibacterial activity was assessed after 5 days and the antifungal activity after 6 days.

The results of the tests are set out below in Table IV (antibacterial activity) Table V (antifungal activity). The results are graded as set out below. The names of the disease organisms are indicated in Table III.

```
0 = no control
1 = slight control
2 = fair control
3 = complete control
```

TABLE III

| Bacterial Disease | Code Table IV | Fungal Disease | Code Table V |
|---|---|---|---|
| Agrobacterium tumefaciens | B1 | Nigrospora sphaerica | F1 |
| Corynebacterium michiganense | B2 | Phytophthora citrophthora | F2 |
| Xanthomonas malvacearum | B3 | Alternaria citri | F3 |
| Erwinia carotovora | B4 | Diplodia natalensis | F4 |
| Xanthomonas oryzae | B5 | Phomopsis citri | F5 |
| Pseudomonas syringae | B6 | Ceratocystis paradoxa | F6 |
| Streptomyces scabies | B7 | Gloeosporium musarum | F7 |
| Pseudomonas phaseolicola | B8 | Penicillium digitatum | F8 |
| Pseudomonas phaseolicola | B9 | Phoma exigua | F9 |
| Erwinia amylovora | B10 | Botrytis tulipae | F10 |
| | | Botryodiplodia theobromae | F11 |
| | | Fusarium caeruleum | F12 |

TABLE IV

| Compound No. | Disease Code | | | | | | | | | |
|---|---|---|---|---|---|---|---|---|---|---|
| | B1 | B2 | B3 | B4 | B5 | B6 | B7 | B8 | B9 | B10 |
| 1 | 2 | 2 | 2 | 0 | 2 | 1 | 0 | 3 | 3 | 3 |
| 2 | 2 | 2 | 2 | 0 | 2 | 2 | 3 | 1 | 2 | 3 |
| 3 | 2 | 2 | 1 | 0 | 3 | 2 | 2 | 0 | 2 | 2 |
| 4 | 0 | 0 | 0 | 0 | 0 | 0 | 0 | 0 | 0 | 0 |
| 6 | 1 | 2 | 0 | 0 | 2 | 0 | 1 | 0 | 1 | 2 |
| 9 | 0 | 0 | 2 | 1 | 3 | 1 | 2 | 1 | 2 | 2 |
| 12 | 2 | 3 | 1 | 1 | 3 | 0 | 3 | 0 | 0 | 0 |
| 13 | 3 | 2 | 2 | 2 | 2 | 0 | 0 | 0 | 0 | 0 |
| 14 | 3 | 1 | 2 | 1 | 2 | 3 | 3 | 0 | 0 | 3 |
| 15 | 0 | 0 | 0 | 3 | 3 | — | — | 0 | 0 | 0 |
| 16 | 0 | 0 | 0 | 0 | 3 | — | 0 | 0 | 0 | 0 |
| 18 | 3 | 3 | 2 | 3 | 3 | 0 | 2 | 0 | 0 | 0 |
| 19 | 3 | 0 | 0 | 0 | 3 | 0 | 3 | 3 | 0 | 1 |
| 10 | 2 | 2 | 2 | 3 | 3 | 3 | 3 | 3 | 3 | 3 |
| 17 | 3 | 3 | 3 | 3 | 3 | 0 | 3 | 0 | 0 | 0 |
| 20 | 3 | 3 | 3 | 3 | 3 | 0 | 3 | 0 | 0 | 3 |

TABLE V

| Compound No. | Disease Code | | | | | | | | | | | |
|---|---|---|---|---|---|---|---|---|---|---|---|---|
| | F1 | F2 | F3 | F4 | F5 | F6 | F7 | F8 | F9 | F10 | F11 | F12 |
| 1 | 3 | 3 | 3 | 3 | 3 | 3 | 3 | 3 | 3 | 3 | 3 | 3 |

TABLE V-continued

| Compound No. | Disease Code | | | | | | | | | | | |
|---|---|---|---|---|---|---|---|---|---|---|---|---|
| | F1 | F2 | F3 | F4 | F5 | F6 | F7 | F8 | F9 | F10 | F11 | F12 |
| 2 | 3 | 3 | 3 | 3 | 3 | 3 | 3 | 3 | 3 | 3 | 3 | 3 |
| 3 | 3 | 3 | 3 | 3 | 3 | 3 | 3 | 3 | 3 | 3 | 3 | 3 |
| 5 | 3 | 3 | 0 | 0 | 0 | 0 | 0 | 3 | 3 | 0 | 0 | 0 |
| 6 | 3 | 3 | 3 | 3 | 3 | 3 | 3 | 3 | 3 | 3 | 3 | 3 |
| 9 | 3 | 3 | 3 | 0 | 3 | 3 | 0 | 3 | 3 | 3 | 0 | 3 |
| 11 | 3 | 3 | 3 | 3 | 3 | 3 | 3 | 0 | 3 | 3 | 3 | 3 |
| 12 | 3 | 3 | 3 | 3 | 3 | 3 | 3 | 3 | 3 | 3 | 3 | 3 |
| 13 | 3 | 3 | 3 | 3 | 3 | 3 | 3 | 3 | 3 | 3 | 3 | 3 |
| 14 | 3 | 3 | 3 | 0 | 2 | 2 | 0 | 3 | 3 | 0 | 3 | 3 |
| 15 | 3 | 3 | 3 | 3 | 3 | 3 | 3 | 3 | 3 | 3 | 3 | 3 |
| 16 | 3 | 3 | 3 | 3 | 3 | 3 | 3 | 3 | 3 | 3 | 3 | 3 |
| 18 | 3 | 3 | 3 | 3 | 3 | 3 | 3 | 3 | 3 | 3 | 3 | 3 |
| 19 | 3 | 3 | 3 | 3 | 3 | 3 | 3 | 3 | 3 | 3 | 3 | 3 |
| 10 | 3 | 3 | 3 | 1 | 3 | 3 | 0 | 3 | 3 | 1 | 3 | 3 |
| 17 | 3 | 3 | 3 | 3 | 3 | 3 | 3 | 3 | 3 | 3 | 3 | 3 |
| 20 | 3 | 3 | 3 | 3 | 3 | 3 | 3 | 3 | 3 | 3 | 3 | 3 |

The above results demonstrate with great clarity the surprisingly useful bactericidal activity of a composition of the present invention.

A number of in vivo tests were carried out against various other bacterial diseases of plants and the details of how these tests were conducted, and the results obtained are set out in the Examples below.

EXAMPLE 24

Dwarf French Bean seeds were infected with *Pseudomonas phaseolicola* (haloblight of beans) by soaking for 6 hours in an 18 hour old nutrient broth shake culture of *Pseudomonas phaseolicola*. The seeds were then air dried to constant weight at 25°C. The seeds were then dressed with a seed dressing containing 100 parts of Compound No. 1 (Example No. 1) per million of seed. The seeds were then planted in sterile compost. After 2 weeks the condition of the emerged seedlings was assessed and they were found to have reduced infection.

EXAMPLE 25

This example illustrates the use of Compound No. 1 to control the disease *Xanthomonas malvacearum* (black arm) on cotton. Cotton seeds were soaked for 24 hours in a $10^{10}$ cells per milliliter suspension of 18 hour old bacteria and then dried. The seeds were then dressed with a formulation containing the compound of Example 3 dispersed in kaolin containing 2% mineral oil. The concentration of the active compound was 12½% by weight and the seed dressing was applied at the rate of 1000 parts of active compound per million parts of seeds. Five seeds were then planted per pot in 2 inch diameter pots, replicated four times. Emergence of the seedlings and disease control was assessed 14 days later after keeping the plants in a relative humidity of 100%. It was found that substantial control of the disease was obtained representing a grading of 3 on a grading scale of from 0 to 3 where 0 represents non-germinated seeds and wholly infected seedlings and 3 represents germinated seeds and disease free seedlings.

EXAMPLE 26

The compounds of the invention were also tested in vitro against the fungal diseases listed below. For this test the chemical is incorporated into potato dextrose agar, usually at 100 ppm. A disc of agar, infected with the growing mycelium of the test fungus, is placed on the surface of the chemically treated agar and the plates are incubated for approximately give days. Activity is scored on a scale 0–3, 0 being no inhibition of mycelial growth and 3 being complete inhibition. The compound scored gradings as shown in Table VI below.

| Disease | Code Letter | Disease | Code Letter |
|---|---|---|---|
| *Pythium ultimum* | A | *Septoria nodorum* | H |
| *Phytophthora palmivora* | B | *Ascochyta pisi* | I |
| *Phytophthora cactorum* | C | *Rhizoctonia solani* | J |
| *Fusarium culmorum* | D | *Sclerotium rolfsii* | K |
| *Fusarium nivale* | E | *Sclerotinia sclerotiorum* | L |
| *Gibberella zeae* | F | *Phytophthora cinnamoni* | M |
| *Helminthosporium sativum* | G | *Verticillium albo-atrum* | N |

TABLE VI

| Compound No. (Table I above) | Disease Code Letter | | | | | | | | | | | | | |
|---|---|---|---|---|---|---|---|---|---|---|---|---|---|---|
| | A | B | C | D | E | F | G | H | I | J | K | L | M | N |
| 1 | 3 | 3 | 3 | 2 | 3 | 3 | 3 | 3 | 3 | 3 | — | 3 | — | — |
| 2 | 3 | 3 | 3 | 3 | 3 | 3 | 3 | 3 | 3 | 3 | 3 | — | — | 3 |
| 3 | 3 | 3 | 3 | 3 | 3 | 3 | 3 | 3 | 3 | 3 | 3 | — | — | 3 |
| 12 | 1 | — | 2 | 2 | 3 | 2 | 3 | 2 | 0 | 3 | 3 | — | — | . |
| 14 | 0 | — | 0 | 0 | 1 | 1 | 1 | 0 | 0 | 0 | 1 | 0 | — | — |
| 15 | 1 | 3 | 2 | 1 | 3 | 3 | 1 | 1 | 1 | 3 | 3 | 1 | 3 | — |
| 16 | 2 | 3 | 0 | 1 | 3 | 3 | 2 | 3 | 1 | 2 | 3 | — | 3 | — |
| 19 | 3 | 3 | 3 | 3 | 3 | 3 | 3 | — | 3 | 2 | 3 | — | 3 | 3 |
| 20 | 3 | 3 | 3 | 3 | — | 3 | 3 | 3 | 3 | 3 | 3 | — | 3 | — |
| 22 | 0 | 2 | 1 | 1 | 2 | 2 | 3 | — | 1 | 1 | — | — | 3 | 3 |
| 23 | 3 | 3 | 3 | 3 | 3 | 3 | 3 | — | 3 | 3 | — | — | 3 | 3 |

EXAMPLE 27

This example illustrates an atomisable fluid comprising a mixture consisting of 25% by weight of Compound No. 1 of Table I and 75% by weight of xylene.

EXAMPLE 28

This example illustrates a dusting powder which may be applied directly to plants or other surfaces and comprises 1% by weight of Compound No. 1 of Table I and 99% by weight of talc.

EXAMPLE 29

25 Parts by weight of the product described in Example 1, 65 parts by weight of xylene, and 10 parts of an alkyl aryl polyether alcohol ('Triton' X-100; 'Triton' is a Trade Mark) were mixed in a suitable mixer. There was thus obtained an emulsion concentrate which can be mixed with water to produce an emulsion suitable for use in agriculture application.

EXAMPLE 30

5 Parts by weight of the product described in Example 1, were thoroughly mixed in a suitable mixer with 95 parts by weight of talc. There was thus obtained a dusting powder.

EXAMPLE 31

10 Parts by weight of the product described in Example 1, 10 parts of an ethylene oxide-octylphenol condensate ("Lissapol" NX; "Lissapol" is a Trade Mark) and 80 parts by weight of diacetone alcohol were thoroughly mixed. There was thus obtained a concentrate which, on mixing with water, gave an aqueous dispersion suitable for application as a spray in the control of insect pests.

EXAMPLE 32

This example illustrates a concentrated liquid formulation in the form of an emulsion. The ingredients listed below were mixed together in the stated proportions and the whole stirred until the constituents were dispersed.

|  | % wt. |
| --- | --- |
| Compound No. 1(Table I) | 20 |
| "Lubrol" L ("Lubrol" is a Trade Mark) | 17 |
| Calcium dodecylbenzenesulphonate | 3 |
| Ethylene dichloride | 45 |
| "Aromasol" H ("Aromasol" is a Trade Mark) | 15 |
|  | 100% |

EXAMPLE 33

The ingredients listed below were ground together in the propostions stated to produce a powdered mixture readily dispersible in liquid.

|  | % wt |
| --- | --- |
| Compound No. 1 (Table I) | 50 |
| Dispersol T ("Dispersol" is a Trade mark) | 5 |
| China Clay | 45 |
|  | 100% |

EXAMPLE 34

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | % wt. |
| --- | --- |
| Compound No. 1 (Table I) | 50 |
| Dispersol T | 12.5 |
| Calcium lignosulphonate | 5 |
| Sodium dodecylbenzenesulphonate | 12.5 |
| Sodium acetate | 20 |
|  | 100% |

EXAMPLE 35

A composition suitable for use as a seed dressing was prepared by mixing all three of the ingredients set out below in the proportions stated.

|  | % wt. |
| --- | --- |
| Compound No. 1 (Table I) | 80 |
| Mineral Oil | 2 |
| China Clay | 18 |
|  | 100 |

EXAMPLE 36

A granular composition was prepared by dissolving the active ingredient in a solvent, spraying the solution obtained onto the granules of pumice and allowing the solvent to evaporate.

|  | % wt |
| --- | --- |
| Compound No. 1 (Table I) | 5 |
| Pumice Granules | 95 |
|  | 100% |

EXAMPLE 37

An aqueous dispersion formulation was prepared by mixing and grinding the ingredients recited below in the proportions stated.

|  | % wt. |
| --- | --- |
| Compound No. 1 (Table 1) | 40 |
| Calcium lignosulphonate | 10 |
| Water | 50 |
|  | 100% |

The following constitutes an explanation of the compositions or substances represented by the various Trade Marks and Trade Names referred to in the foregoing Examples.

| "LUBROL" L | is a condensate of 1 mole of nonyl phenol with 13 molar proportions of ethylene oxide. |
| --- | --- |
| "AROMASOL" H | is a solvent mixture of alkylbenzenes |

| | |
|---|---|
| "DISPERSOL" T | is a mixture of sodium sulphate and a condensate of formaldehyde with the sodium salt of naphthalene sulphonic acid. |
| "LISSAPOL" NX | is a condensate of 1 mole of nonyl phenol with 8 moles of ethylene oxide. |
| "TRITON" X–100 | is an alkyl aryl polyether alcohol. |

EXAMPLE 38

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying contained 0.01% of the test compound. All the soil drench solutions also contained 0.01% of the test compound. The plants were then infected with the disease it was desired to control and after a period of days, depending upon the particular disease, the extent of the disease was visually assessed. The results are given in Table VII below, wherein the extent of the disease is given in the form of a grading as follows:

| Grading | Percentage Amount of Disease |
|---|---|
| 0 | 61 to 100 |
| 1 | 26 to 60 |
| 2 | 6 to 25 |
| 3 | 0 to 5 |

In Table VI, the disease is given in the first column, and in the second column is given the time which elapsed between infecting the plants and assessing the amount of disease.

TABLE VI

| Disease and Plant | Time interval (days) | Disease code letter (Table VII) |
|---|---|---|
| Puccinia recondita (wheat) | 10 | A |
| Phytophothora infestans (tomato) | 4 | B |
| Plasmopara viticola (vine) | 7 | C |
| Podosphaera leucotricha (apple) | 10 | D |
| Botrytis cinerea (tomato) | 3 | E |

TABLE VII

| Compound No. | A | B | C | D | E |
|---|---|---|---|---|---|
| 1 | 0 | 3 | 3 | 2 | 2 |
| 2 | 0 | — | 1 | 0 | 0 |
| 3 | 0 | — | 0 | P | 2 |
| 4 | 0 | 2 | 3 | 0 | 1 |
| 5 | 0 | — | 1 | 0 | 0 |
| 6 | 0 | — | 2 | 0 | 0 |
| 7 | 0 | 0 | P | 0 | 0 |
| 8 | 0 | 1 | 0 | 0 | 0 |
| 9 | 0 | 0 | 0 | 0 | 1 |
| 10 | 0 | 0 | 0 | 0 | 0 |
| 11 | 0 | 0 | 3 | 0 | 0 |
| 12 | 0 | 2 | 3 | 2 | 1 |
| 13 | 3 | 3 | 3 | 3 | 1 |
| 14 | 0 | 3 | 0 | 0 | 0 |

TABLE VII-continued

| Compound No. | A | B | C | D | E |
|---|---|---|---|---|---|
| 15 | 0 | 1 | 0 | 0 | 3 |
| 16 | 0 | 0 | 0 | 0 | 2 |
| 17 | 3 | 2 | 3 | 3 | 3 |
| 18 | 3 | — | 3 | 0 | 3 |
| 19 | 0 | 3 | 3 | 1 | 3 |
| 20 | 0 | 3 | 3 | — | 3 |
| 21 | 0 | 0 | 3 | 0 | 3 |

EXAMPLE 39

This example illustrates the activity of Compound No. 1 of Table I against the disease *Streptomyces scabies* (potato scab).

The test procedure was as follows:

Soil was taken from the top 10 cm of an infested field, thoroughly air-dried, sieved, mixed and stored till needed. Small shoots, obtained from tubers of the scab-susceptible c.v. Red Craigs Royal (cf. McIntosh and Eveling, 1965), were planted in potting compost in seed boxes for 1–2 weeks, so that the roots grew to 7 cm or more.

Inoculum, for boosting the natural infectivity of the field soil, was made by drying the contents of liquid shake-cultures (Vruggink and Maat, 1968) on to field soil, using about 150 ml/kg of soil.

Booster inoculum (about 50 g/kg) and test chemical (usually 50 ppm) were thoroughly mixed with field soil in a food-mixer. Pots (12 cm diam.) were filled with three layers of soil of equal depth. The bottom layer was potting compost and the middle layer treated field soil; a circle of 'Terylene' net (0.5 mm mesh), large enough to reach up the sides of the pot to the soil surface, separated the middle layer from the top layer, which was also of treated field soil. One rooted shoot was transplanted into the top layer of each pot.

The pots were suitably randomized in a glasshouse or growth room, with minimum temperature 20°C (day) and 15°C (night). They were watered freely for the first 10 days, but after that were placed on a sand bed without overhead watering. During very hot weather extra water was given as necessary.

The tubers, harvested 8–10 weeks after potting, were weighed and graded for scab infection (Large and Honey, 1955; Lapwood and Dyson, 1966) to give yield and mean 'scab index' per pot. Results from five pots per treatment, were assessed giving mean yields and scab indices.

The compound (No. 1 of Table I) gave complete control of the disease, no scab infection being detected.

EXAMPLE 40

This example illustrates the activity of Compound No. 1 of Table I against the disease *Erwinia Carotovora* (Potato Soft Rot). The test procedure was as follows:

Five discs of potato tissue, each 1 centimeter in diameter and 1 millimeter thick were placed in a suspension containing 500 parts per million of the compound, and were allowed to remain there for 5 minutes. They were then removed and placed in a petri dish containing 0.2 milliliters of an 18-hour old suspension ($10^9$ cells per milliliter) of a culture of *Erwinia carotovora*.

Twenty-four hours later the discs were assessed as being either firm or rotted.

Comparison was made with similar discs dipped in solutions of sodium hypochlorite (500 parts per million) and streptomycin (500 parts per million), and in ordinary water (as an untreated control). Results were as follows:

| Treatment | Assessment of Discs |
|---|---|
| Compound No. 1 of Table I | No discs rotted |
| Sodium Hypochlorite | All discs rotted |
| Streptomycin | 2 discs rotted |
| Water (untreated) | All discs rotted. |

In a further test against the same disease twenty whole potatoes were dipped in a suspension solution containing 500 parts per million of Compound No. 1 of Table I. and then placed in four polythene (i.e. plastic) bags together with 1 milliliter of an 18 hour old suspension ($10^9$ cells per milliliter) of a culture *Erwinia carotovora*. The same number of potatoes was dipped only in water and then similarly inoculated with the disease. The bags were sealed and allowed to stand for 12 days. They were then opened and a count made of the number of potatoes which had rotted.

| Treatment | Number of Rotted Potatoes |
|---|---|
| Compound No. 1 of Table I | 10 |
| Water (untreated control) | 19 |

EXAMPLE 41

This Example illustrates the activity of Compound No. 18 of Table I against the diseases *Corynebacterium michiganense* and *Xanthomonas oryzae*. The test procedure in each instance was as follows:

Test Procedure for *Corynebacterium michiganense* (tomato canker).

Tomato seedlings grown in 2 inch pots were treated with a root drench (10 ml.) containing the chemical compound under test. A further group of seedlings was treated with a root drench (10 ml) containing Streptomycin (1000 ppm). Twenty-four hours later the seedlings were inoculated with *Corynebacterium michiganense* by applying a suspension of cells of this bacterium to wounds made in the seedlings.

After 3 weeks the condition of the tomato seedlings was assessed on a 0 - 4 scale; where 0 is no control, 1 is slight control, 2 is fair control, 3 is good control, and 4 is complete control.

Test Procedure for Xanthomonas Oryzae (Bacterial Blight of Rice).

Rice seedlings at the three leaf stage were root drenched (10 ml.) and sprayed with the chemical compound under test. Twenty-four hours later the plants were inoculated by wounding with forceps dipped in a suspension of *Xanthomonas oryzae*. After 14 days at 100% relative humidity the seedlings were assessed for disease on a 0–4 scale, where the gradings 0, 1, 2, 3 and 4 represent the same degree fo control as previously described for the disease above. Compound No. 18 of Table I gave a grading of 4 for each disease, i.e. complete control.

EXAMPLE 42

This Example illustrates field trial results obtained with Compound No. 1 of Table I against a combination of the diseases *Pythium ultimum* and *Rhizoctonia solani* on cotton (damping off and sore shin, respectively on cotton) and *Pythium ultimum* on peas (Damping off on peas). In the seed dressing tests cotton seed and peas were dressed with a formulation containing the chemical, at the rate shown, and then sown. In the "in furrow" treatment the chemical was scattered along the furrows and the seed then sown on top. The seedling emergence was assessed later.

The results obtained are shown in the Table VIII below.

TABLE VIII

| Trial | Treatment | Rate of Application | Seedling Emergence as % of control |
|---|---|---|---|
| Cotton Seed Dressing (U.S.A.) | Compound No. 1 of Table I | 1000 ppm | 187 |
| | BUSAN 72 2(thiocyanomethyl-thio)benzothiazol | 1000 ppm | 140 |
| | Untreated Control | — | 100 |
| Cotton "in furrow" treatment (U.S.A.) | Compound No. 1 of Table I | 1.5 lb per acre | 125 |
| | Soil-treater X (1:1 mixture of Captan and penta-chlornitrobenzene (PCNB) | 2.0 lb per acre | 119 |
| | Untreated control | — | 100 |
| Cotton Seed Dressing (Australia) | Compound No. 1 of Table I | 1000 ppm | 330 |
| | Vitavax/Thiram mixture | 2000 ppm | 290 |
| | Untreated Control | — | 100 |
| Pea Seed Dressing | Compound No. 1 of Table I | 500 ppm | 180 |
| | "Milcol" (Active ingredient drazoxolon) | 500 ppm | 180 |
| | Untreated Control | — | 100 |

We claim:

1. A method of combating fungi which comprises contacting said fungi or the loci thereof with a fungicidally effective amount of a quinoxaline derivative having the formula:

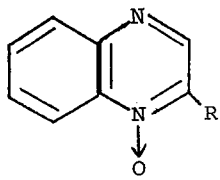

or a salt thereof wherein R is selected from the group consisting of SO₂X, SOX and SX where X contains from 1 to 7 carbon atoms and is selected from the group consisting of unsubstituted alkyl, alkenyl, alkynyl, aryl, alkaryl, and aralkyl; or alkyl containing 1–7 carbon atoms substituted with halogen, carboxy, ethoxy carbonyl or thiocyano.

2. The method of claim 1 wherein the quinoxaline derivative has the formula:

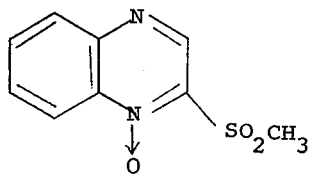

* * * * *